May 7, 1963 D. J. WILLEMS 3,088,437
LIVESTOCK FEEDING DEVICE
Filed March 7, 1960 2 Sheets-Sheet 1
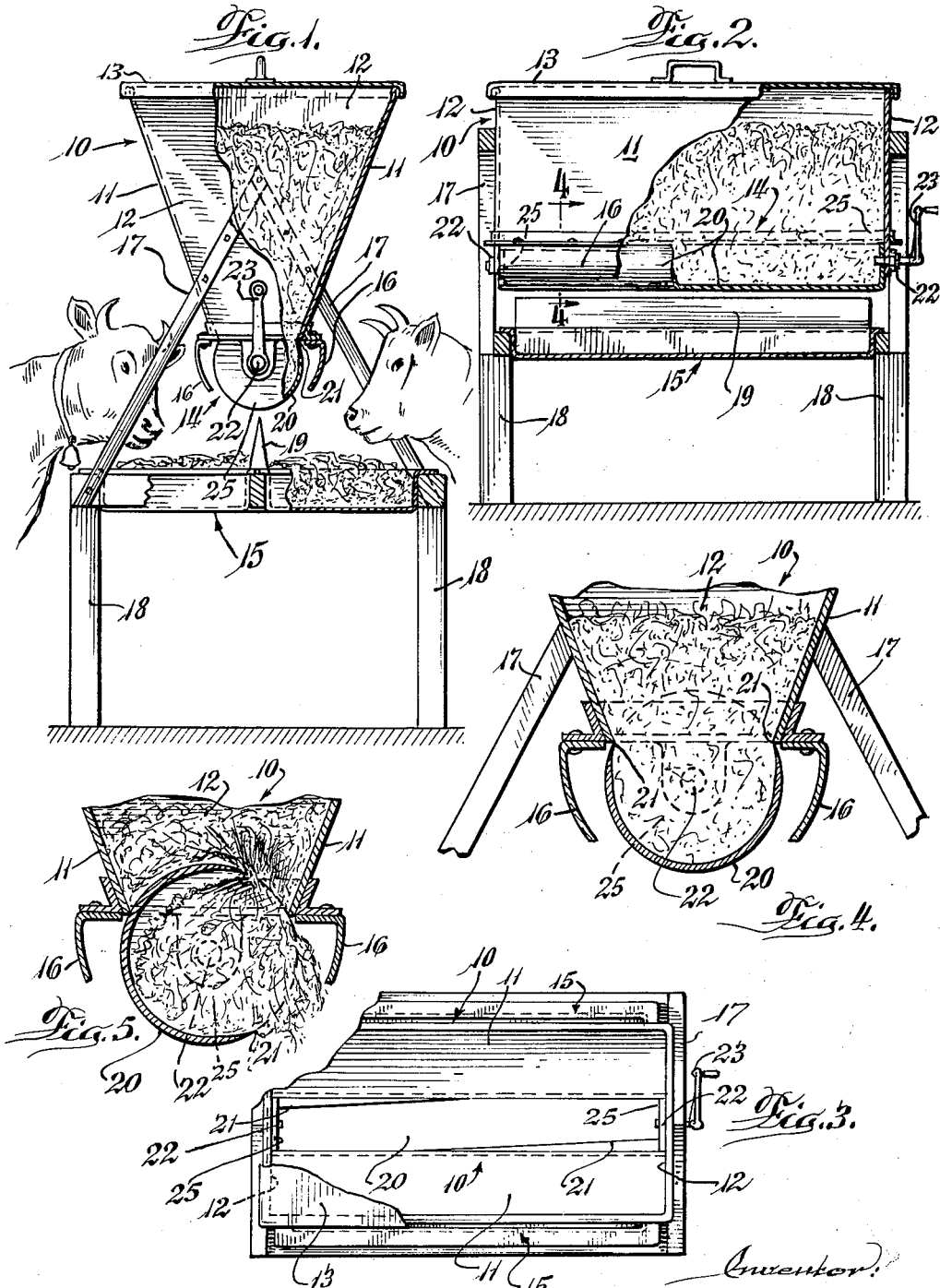
Inventor:
Donald J. Willems
By Carl C. Batz
Attorney May 7, 1963 — D. J. WILLEMS — 3,088,437

LIVESTOCK FEEDING DEVICE

Filed March 7, 1960 — 2 Sheets-Sheet 2

Inventor:
Donald J. Willems
By Carl C. Batz
Attorney

United States Patent Office 3,088,437
Patented May 7, 1963

3,088,437
LIVESTOCK FEEDING DEVICE
Donald J. Willems, Omaha, Nebr., assignor, by mesne assignments, to Armour and Company, Chicago, Ill., a corporation of Delaware
Filed Mar. 7, 1960, Ser. 13,007
3 Claims. (Cl. 119—56)

My invention relates to livestock feeding devices. It particularly relates to an improved apparatus and method for mechanically delivering and metering gravity descending animal feeds.

Manual feeding of livestock is an expensive, constant and burdensome task. Mechanization of livestock feeding is therefore desirable. Frequent feeding of growing animals, although often advantageous, is seldom commercially feasible unless self-feeding devices are employed. It is known that dividing a livestock ration into several portions which are then fed throughout each day usually results in increased efficiency of feed utilization. Many animals fed for example 8 times daily grow more rapidly and economically than animals receiving the same feed formulation but fed only twice daily.

In order to insure that a well-balanced ration is consumed, a single complete formulation rather than several mixtures or single components are commonly prepared. Roughage such as hay is mixed with other feed materials to prepare a single complete feed. Complete rations containing roughage place increased demands on feeding devices. A device capable of satisfactorily delivering grains is often incapable of satisfactorily delivering a fibrous ration containing roughage. Conventional livestock feeding devices usually cannot be used to efficiently meter and deliver feed materials which are not free flowing. Conventional valves often promote bridging of matted feed materials with resulting nondelivery.

Feeding devices capable of reliable positive metering can be especially advantageously employed in locations where because of legal requirements feed quantity must be measured at the time it is supplied to livestock. Terminal markets, auction markets, truck and rail feeding and transfer points are examples of locations where feed is purchased by the livestock owner and must be measured by the seller.

Limited feeding of some animals, as breeding herds, necessitates use of accurate and efficient metering devices. Usual types of feeding apparatus wherein augers and rotating vanes are utilized in the valve assemblies do not satisfactorily measure and deliver all types of feed material.

It is the primary object of this invention to provide a livestock feeding apparatus capable of delivering all types of gravity descending feed materials.

Another object of this invention is to provide a method of accurately measuring and delivering non-free-flowing livestock feed materials.

A further object is to provide a valve in a livestock feeder capable of cutting through fibrous feed material to thereby deliver a measured quantity of feed material.

It is still another object of this invention to provide a valve in a livestock feeder which will cut through feed material without creating back-pressure.

Another object of this invention is to provide a livestock feeder capable of precisely metering gravity descending feed materials which tend to bridge and block the feeding apparatus.

Other objects and advantages of this invention will become apparent during the course of the following description.

In the accompanying drawings, forming a part of this application, and in which like numerals are employed to designate like parts throughout the drawings, FIG. 1 is an end view partially in section of an animal feeder designed in accordance with the principles of this invention;

FIG. 2 is a side view partially in section of the same;

FIG. 3 is a plan view;

FIG. 4 is a cross-sectional view on line 4—4 of FIG. 2;

FIG. 5 is a view substantially the same as FIG. 4 showing the valve in an open position;

Figure 6:
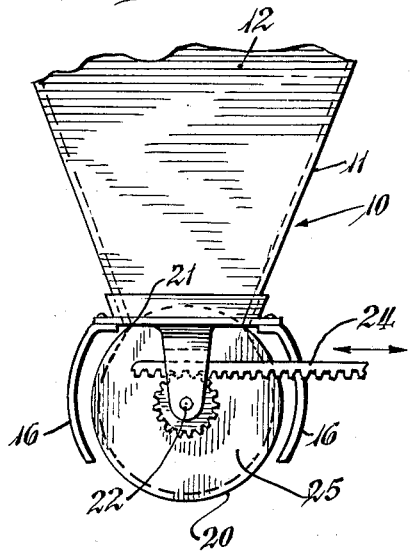
FIG. 6 is a detailed end view showing a reciprocating gear rack usable for rotating the feeder valve.

In FIGS. 1 to 6, illustrating one embodiment of the invention, numeral 10 designates a feed storage receptacle having an open bottom and formed by sidewalls 11 and ends 12 and having a removable top cover 13. A valve assembly 14 is attached to the lower portion of the receptacle 10. A feed bunk 15 is positioned below the valve assembly. An elongate inverted V-wedge 19 coextensively positioned along the longitudinal center of the feed bunk divides the bunk into two sections, shields 16 are affixed to the receptacle sidewalls 11 and extend downwardly over the upper portion of the valve assembly 14. Supporting members 17 secured to frame 18 holding the feed bunk 15 suspend the feeding apparatus above the feed bunk.

The valve assembly in FIGS. 1 to 6, the first embodiment, includes a slotted hollow partial cylinder formed by a sidewall 20 and circular end pieces 25. An opening in the cylinder sidewall extending substantially longitudinally is defined by two blade-edges 21 formed by the cylinder sidewall 20. The cylinder is rotatably suspended from bearing assemblies 22 at each of its ends. A crank 23, referring to FIGS. 1 to 3, is furnished to facilitate rotation of the valve cylinder. In FIG. 6 a reciprocating gear rack 24 is employed to rotate the valve cylinder. The rotatable cylinder is positioned within the bottom opening of the receptacle 10. The valve cylinder parts lie in close proximity to the bottom periphery of the receptacles formed by the lower edges of receptacles sidewall 11 and ends 12 to thereby shut off passage of material from the receptacle to the feed bunk therebelow when the valve is in the closed position.

In some circumstances it is preferred that the axis of rotation, of the valve assembly in FIGS. 1 to 6, lies in the plane formed by the bottom periphery of the storage receptacle sidewalls 11 and ends 12. Positioning the valve axis in this plane permits a maximum width bottom opening for a valve of given size. However, depending on material to be delivered and other circumstances, the valve level may be varied, provided that the circle of rotation cuts through the plane formed by the bottom periphery of the receptacle 10 as shown in FIGS. 1–6. The circle of rotation may therefore be varied by a maximum of the radius of the circle of rotation above or below the plane of the receptacle bottom opening.

Figure 8:
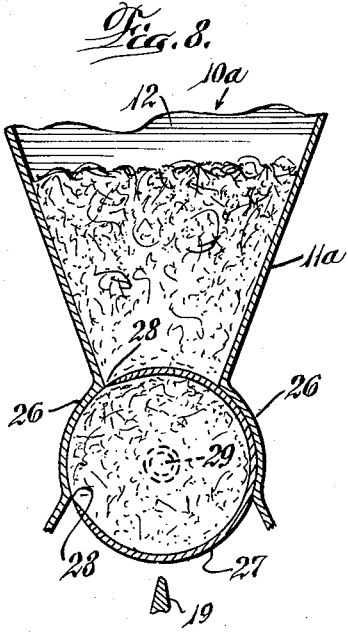
FIG. 8 is another view of the second embodiment substantially the same as FIG. 7 but showing the valve partially rotated.
Figure 7:
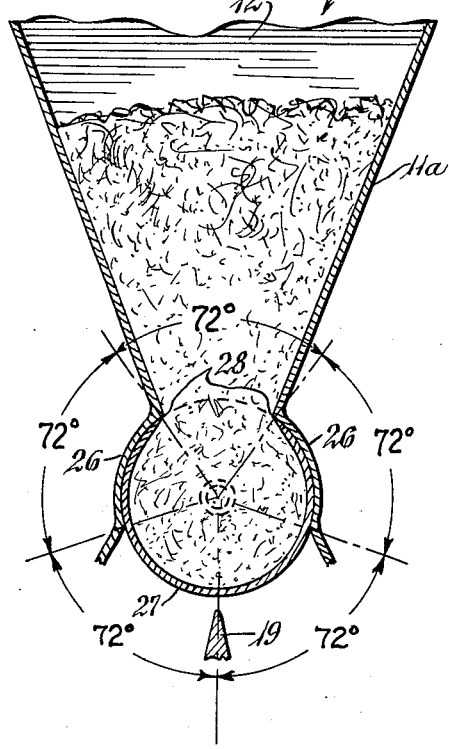
FIG. 7 is a cross-sectional side view on line 4—4 of FIG. 2 representing a second embodiment of this invention.
Figure 9:
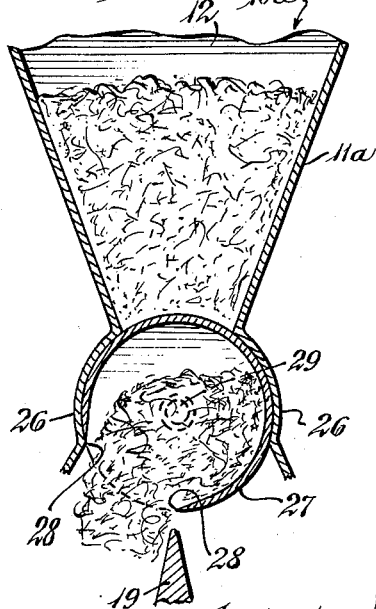
FIG. 9 is a view substantially the same as FIG. 8 but showing the valve of the second embodiment in a delivery position.

Now referring to FIGS. 7 to 9—illustrating a second embodiment of this invention, a positive metering valve assembly—a cylindrical chamber having enclosed ends is formed by two cylindrical walls located at the lower end of sidewalls 11a of a feed storage receptacle 10a. Top and bottom openings are formed between the cylindrical chamber walls 26. A rotatable partial cylinder formed by a sidewall 27 having blade edges 28 is located between the chamber walls 26. Sidewall 27 lies in close proximity to the chamber walls 26 to shut off feed flow from the receptacle 10a while the valve is in the closed position. Bearing assemblies 29 at each end rotatably position the hollow cylinder between the chamber walls 26.

Both blade-edges 28 lie immediately adjacent to the juncture between receptacle sidewalls 11a and chamber walls 26 when the valve is in the closed position.

The cylindrical chamber walls 26 describe arcs at least equal to the arc described by the segment of the circle of rotation by the opening between the blade edges 28, illustrated in FIG. 8. This top opening arc between the walls 26 is not greater than 90°. For purposes of illustration FIG. 7 exhibits a top opening arc between cylindrical walls 26 of 72°, a like arc of 72° between the blade edges 28, and 72° arcs formed by each cylindrical chamber wall 26. The rotatable cylinder sidewall 20 therefore forms an arc of not less than 270°.

If reciprocating valve action is resorted to, the second embodiment of this invention could be constructed in the following manner. Referring to FIG. 7, one of the cylindrical members 26 may be removed thereby leaving only one cylindrical member attached to the lower portion of receptacle sidewalls 11a. The one remaining cylindrical member 26 extends to essentially encompass the opening in rotatable member 27 formed by knife edges 28. A three sector circle of rotation having up to about 120° in each sector is then formed. Sector 1 is the top opening between receptacle sidewalls 11a; sector 2 is the first stage of rotation in which the opening between edges 28 is essentially encompassed by the one remaining cylindrical member 26 to thereby prevent through spillage of feed material from receptacle 10a; sector 3 is the bottom delivery position during which feed drops from the chamber formed by said rotatable member 27. After delivery the rotatable member reverses direction and returns to the original position in which the opening between edges 28 communicates with receptacle 10a. This three sector design although operable is not preferred because it prevents straight-through loading of or discharge from the valve assembly.

It is apparent that in FIGS. 1 to 6 the rotatable valve cylinder may have an opening greater than 90°.

The bladed edges of the rotatable cylinders are preferably not parallel to the longitudinal axis of rotation. Referring to FIG. 3, blade-edges 21 are diagonal to the axis of rotation. If the cutting blade edge is diagonal to the axis of rotation less force is required for rotation due to progressive movement of the initial tangential shear point along the cylinder length during each rotation. A blade edge parallel to the axis of rotation will of course require a greater force to accomplish tangential shearing during rotation because of the simultaneous contact with shearable material along the entire length of the cylinder at the commencement of each rotation. Edges parallel to the axis of rotation may however be required where positive measured delivery of some feeds is desired.

Again referring to FIGS. 1 to 6, feed materials placed in receptacle 10 descend by gravity into the rotatable hollow cylinder. This cylinder is rotated in the desired direction as pictured by FIG. 5. If material contained in the receptacle is free flowing, the valve may be held open in a stationary position until the desired quantity of feed has been delivered. With materials tending to form a mat which interferes with expeditious delivery it may be necessary to rotate or oscillate the valve to shear through the matted material and thereby restore normal flow. The shearing force tangential to the circumference of rotation is applied without creating upward thrust or back pressure which could encourage compacting and bridging of the feed material remaining in the receptacle.

Bridging prevents material from reaching the valve which then results in blockage of the feeding device.

Referring to FIGS. 7 to 9, feed material is placed in receptacle 10a. The feed descends into the hollow cylinder 27 as illustrated in FIG. 7. A unit volume of material is then cut from the remaining supply in the receptacle, shown in FIG. 8, by partial rotation of the cylinder 27. When the cylinder has rotated about 90° a measured quantity of material has been separated from the remaining supply. This removal is accomplished without application of upward back pressure to the feed. Upon further rotation, FIG. 9, the unit volume of feed is dumped into the feed bunk. On completion of the rotation cycle another unit volume of feed enters the rotating cylinder with unmeasured spillage being prevented by the cylindrical chamber sidewalls 26 which extend so as to encompass the opening between the blade-edges 28.

In a livestock feeder designed in accordance with this invention only a tangential shear force is applied to the feed mass by the hollow cylinder valve, precluding the potential bridging effect promoted by application of compacting upward thrust.

It is to be understood that the forms of my invention, herewith shown and described, are to be taken as preferred examples of the same, and various changes in shape, size, and arrangement may be resorted to without departing from the spirit of my invention, or the scope of the subjoined claims.

I claim:
1. A livestock feeding device comprising a feed storage receptacle formed by side walls and ends and having a bottom opening, a frame attached to said receptacle serving to suspend such receptacle above ground level, a divided feed bunk positioned below said receptacle to thereby receive feed material passing out of said receptacle, an exit valve assembly positioned within the bottom opening of said receptacle, operating means on the assembly for rotating said valve assembly and for reversing the rotation of said valve assembly, said valve assembly comprising a hollow rotatable cylinder having a side wall and closed ends and coextensive with the length of said bottom opening, said cylinder having an elongated slot extending lengthwise substantially the entire length of said cylinder, said slot formed by two blade edges, the circumference of the circle of rotation of said cylinder cutting through the plane formed by the bottom periphery of said receptacle side walls and ends, said blade edges being adaptable for cutting through feed material contained in said receptacle.

2. A livestock feeder as recited in claim 1 wherein said blade edges are substantially parallel to each other.

3. A livestock feeder as recited in claim 1 wherein said blade edges are parallel to the axis of rotation of said valve assembly and wherein the width of the opening between said receptacle side walls is substantially equal to the width of opening between said blade edges.

References Cited in the file of this patent

UNITED STATES PATENTS

| 1,342,456 | Nagel | June 8, 1920 |
| 1,540,290 | Selinger et al. | June 2, 1925 |
| 1,572,981 | Aldrich et al. | Feb. 16, 1926 |
| 1,845,072 | Beckman | Feb. 16, 1932 |
| 2,416,825 | Dowling | Mar. 4, 1947 |
| 2,720,353 | Stirn et al. | Oct. 11, 1955 |
| 2,761,602 | Winkel | Sept. 4, 1956 |

FOREIGN PATENTS

| 704,254 | Great Britain | Feb. 17, 1954 |
| 148,871 | Sweden | Feb. 15, 1955 |